US011206427B2

(12) United States Patent
Zhang et al.

(10) Patent No.: US 11,206,427 B2
(45) Date of Patent: Dec. 21, 2021

(54) SYSTEM ARCHITECTURE AND METHOD OF PROCESSING DATA THEREIN

(71) Applicant: Purdue Research Foundation, West Lafayette, IN (US)

(72) Inventors: Song Zhang, Lafayette, IN (US); Tyler Bell, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/363,254

(22) Filed: Mar. 25, 2019

(65) Prior Publication Data

US 2019/0394489 A1 Dec. 26, 2019

Related U.S. Application Data

(60) Provisional application No. 62/651,356, filed on Apr. 2, 2018.

(51) Int. Cl.
*H04N 19/60* (2014.01)
*G06T 7/60* (2017.01)
(Continued)

(52) U.S. Cl.
CPC ............... *H04N 19/60* (2014.11); *G06T 7/40* (2013.01); *G06T 7/521* (2017.01); *G06T 7/60* (2013.01); *G06T 7/90* (2017.01); *H04N 13/15* (2018.05); *H04N 13/261* (2018.05); *H04N 19/136* (2014.11); *G06T 2207/10024* (2013.01); *G06T 2207/10028* (2013.01)

(58) Field of Classification Search
CPC ...... H04N 19/06; H04N 19/136; H04N 13/15; H04N 13/261; G06T 7/60; G06T 7/40; G06T 7/90; G06T 7/521; G06T 2207/10024; G06T 2207/10028

USPC ........................................................ 382/108

See application file for complete search history.

(56) References Cited

U.S. PATENT DOCUMENTS 10,593,122 B1 * 3/2020 Waggoner ............. G06T 19/006
2006/0067573 A1 * 3/2006 Parr ......................... G06K 9/00
382/154

(Continued)

OTHER PUBLICATIONS

N. Karpinsky and S. Zhang, "Composite phase-shifting algorithm for three-dimensional shape compression," Opt. Eng. 49, 063604 (2010).

(Continued)

*Primary Examiner* — Congvan Tran
(74) *Attorney, Agent, or Firm* — Purdue Research Foundation

(57) ABSTRACT

A method of processing data includes obtaining, by an encoding medium, the data of at least one of a geometry information or a texture information of a target. The method additionally includes converting, by the encoding medium, the geometry information into a plurality of periodical functions. Additionally, converting, by the encoding medium, the texture information into a second 2-D representation. Further, the method includes converting, by the encoding medium, each periodical function of the plurality of periodical functions and the second 2-D representation into an image. Moreover, the method includes decoding, by a decoding medium, the image into a 3-D representation using a transformation.

8 Claims, 2 Drawing Sheets

(51) Int. Cl.
*G06T 7/40* (2017.01)
*G06T 7/90* (2017.01)
*H04N 19/136* (2014.01)
*H04N 13/15* (2018.01)
*H04N 13/261* (2018.01)
*G06T 7/521* (2017.01)

(56) References Cited

U.S. PATENT DOCUMENTS

| | | | |
|---|---|---|---|
| 2007/0098290 A1* | 5/2007 | Wells | G06T 15/50 382/254 |
| 2011/0298891 A1* | 12/2011 | Zhang | G01B 11/2509 348/43 |
| 2014/0003658 A1* | 1/2014 | Hein | G06K 9/00597 382/103 |
| 2014/0063024 A1* | 3/2014 | Zhang | G06T 9/007 345/506 |
| 2016/0042552 A1* | 2/2016 | Mcnabb | G06T 15/08 345/424 |
| 2019/0195975 A1* | 6/2019 | Liu | G01R 33/561 |

OTHER PUBLICATIONS

N. Karpinsky, Y. Wang, and S. Zhang, "Three-bit representation of three-dimensional range data," Appl. Opt. 52, 2286-2293 (2013).

S. Zhang, "Three-dimensional range data compression using computer graphics rendering pipeline," Appl. Opt. 51, 4058-4064 (2012).

T. Bell and S. Zhang, "Multiwavelength depth encoding method for 3D range geometry compression," Appl. Opt. 54, 10684-10691 (2015).

Y. An, J.-S. Hyun, and S. Zhang, "Pixel-wise absolute phase unwrapping using geometric constraints of structured light system," Opt. Express 24, 18445-18459 (2016).

Z. Hou, X. Su, and Q. Zhang, "Virtual structured-light coding for three-dimensional shape data compression," Opt. Laser Eng. 50, 844-849 (2012).

Y. Wang, L. Zhang, S. Yang, and F. Ji, "Two-channel high-accuracy holoimage technique for three-dimensional data compression," Opt. Laser Eng. 85, 48-52 (2016).

A. Bletterer, F. Payan, M. Antonini, and A. Meftah, "Point cloud compression using depth maps," In IS&T International Symposium on Electronic Imaging 2016, 3DIPM-397.1-3DIPM-397.6, 2016.

X. Gu, S. Zhang, L. Zhang, R. Martin, P. Huang, and S.-T. Yau, "Holoimages," Proceedings of the 2006 ACM Symposium on Solid and Physical Modeling, 129-138, 2006.

N. Karpinsky and S. Zhang, "Holovideo: Real-time 3D range video encoding and decoding on GPU," Opt. Laser Eng.50(2), 280-286, 2012.

P. Ou and S. Zhang, "Natural method for three-dimensional range data compression," Appl. Opt. 52(9), 1857-1863, 2013.

T. Bell, B. Vlahov, J. Allenbach, and Song Zhang, "Three-dimensional Range Geometry Compresson via Phase Encoding," Appl. Op. 56(33), 9285-9292, 2017.

T. Bell, J.P. Allenbach, and S. Zhang, Holostream: High-Accuracy, High-Speed, 3D Range Video Encoding and Streaming Across Standard Wireless Networks, 2018.

* cited by examiner

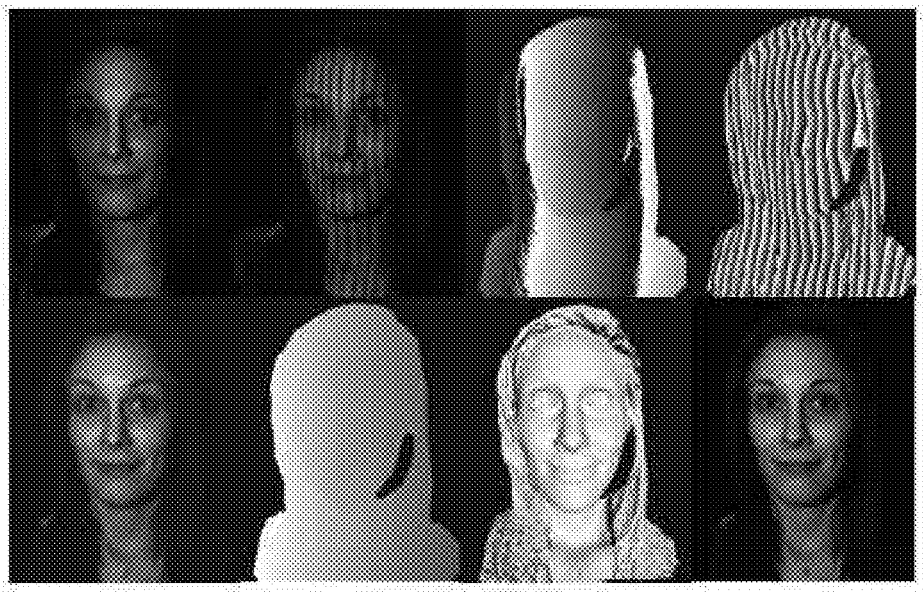
Figure 1
Figure 2
300
305→310→315→320
Figure 3

400

405→410→415

SYSTEM ARCHITECTURE AND METHOD OF PROCESSING DATA THEREIN

CROSS-REFERENCE TO RELATED APPLICATIONS

The present U.S. patent application is related to and claims the priority benefit of U.S. Provisional Patent Application Ser. No. 62/651,356, filed Apr. 2, 2018, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

Conventional 3D video communication technologies have limited applications and potentially limited adoption partially because of (1) the required specialized and often expensive hardware; (2) inflexible and complex system setup; (3) highly demanding computational resources for real-time realization; (4) low-resolution and low-accuracy 3D sensing; and/or (5) the required high speed network bandwidths for 3D content transmission due to inefficient 3D video data compression technologies.

Conventional 3D video communication software relate to merging depth and color texture maps from multiple Kinect devices to capture room-sized 3D scenes in real-time which can be rendered on a remote user's display. The above technique requires up to 5.3 MB per frame of 3D data at each node, and thus it requires a high-speed connection to allow the users to share a virtual 3D working space with one another. Some software systems acquires a 3D mesh of a user or object in one location and transmits it to remote users for visualization on augmented reality headsets. Although this system enables very natural user interactions, the transmission requires a very high-speed wired connection to deliver its 1-2 Gpbs of data at 30 Hz.

There is, therefore an unmet need for a novel approach for a system architecture and a method of processing data therein.

SUMMARY

Various embodiments of the present application relate to converting acquired 3D geometry into standard 2D images, thereby allowing existing 2D video communication platforms to be leveraged for low bandwidth 3D video communications. According to one or more embodiments, 3D video data is encoded frame by frame into a standard 2D image format by a first computing device. After compression and transmission, a receiving computing device (i.e. mobile devices, laptops, tablets, etc) decompresses the 2D video and decodes the original 3D data frame by frame.

The above data processing method when paired with H.264 codec achieves compression ratios of 1,602:1 while maintaining high-quality 3D video with color texture. This allows for transmission of 3D video and color texture content over existing wireless networks using only 4.8 Mbps. Tests of various embodiments indicate that the above method wirelessly delivers coordinate and color data, consisting of up to 307,200 vertices per frame, at 30 Hz to multiple mobile phones and/or tablets. A bitrate of only 0.48 Mbps was sufficient to deliver lower quality 3D geometry while maintaining high quality color texture.

One aspect of the present application relates to a non-transitory computer-readable medium encoded with a computer-readable program, which, when executed by a processor, will cause a computer to execute a method of encoding data, wherein the method includes obtaining the data of at least one of a geometry information or a texture information of a target. The method additionally includes converting the geometry information into a plurality of periodical functions. Additionally, the method includes converting the texture information into a second 2-D representation. Further, the method includes converting each periodical function of the plurality of periodical functions and the second 2-D representation into an image.

Another aspect of the present application relates to a non-transitory computer-readable medium encoded with a computer-readable program, which, when executed by a processor, will cause a computer to execute a method of decoding data, wherein the method includes obtaining a plurality of encoding parameters from an encoding phase, wherein each encoding parameter of the plurality of encoding parameters comprises at least one of an image, a sequence of data, or an array of data. The method additionally includes converting at least one of the sequence of data, the image, or the array of data into a 2-D representation. Furthermore, the method includes converting the 2-D representation into a 3-D representation using a transformation.

Still another aspect of the present application relates to a non-transitory computer-readable medium encoded with a computer-readable program, which, when executed by a processor, will cause a computer to execute a method of processing data, wherein the method includes obtaining, by an encoding medium, the data of at least one of a geometry information or a texture information of a target. The method additionally includes converting, by the encoding medium, the geometry information into a plurality of periodical functions. Additionally, the method includes converting, by the encoding medium, the texture information into a second 2-D representation. Further, the method includes converting, by the encoding medium, each periodical function of the plurality of periodical functions and the second 2-D representation into an image. Moreover, the method includes obtaining by a decoding medium a plurality of encoding parameters from the encoding medium, wherein each encoding parameter of the plurality of encoding parameters comprises at least one of an image, a sequence of data, or an array of data. The method also includes converting by the decoding medium at least one of the sequence of data, the image, or the array of data into a 2-D representation. Further, the method includes converting by the decoding medium the 2-D representation into a 3-D representation using a transformation.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 1 illustrates an example of reconstructing a 3D single frame, in accordance with one or more embodiments.

FIG. 2 illustrates an example of an image, E, which encodes the same 3D geometry and color texture illustrated in FIG. 1.

FIG. 3 illustrates an overview of an algorithm of encoding data in accordance with one or more embodiments.

DETAILED DESCRIPTION

Figures 4, 5:
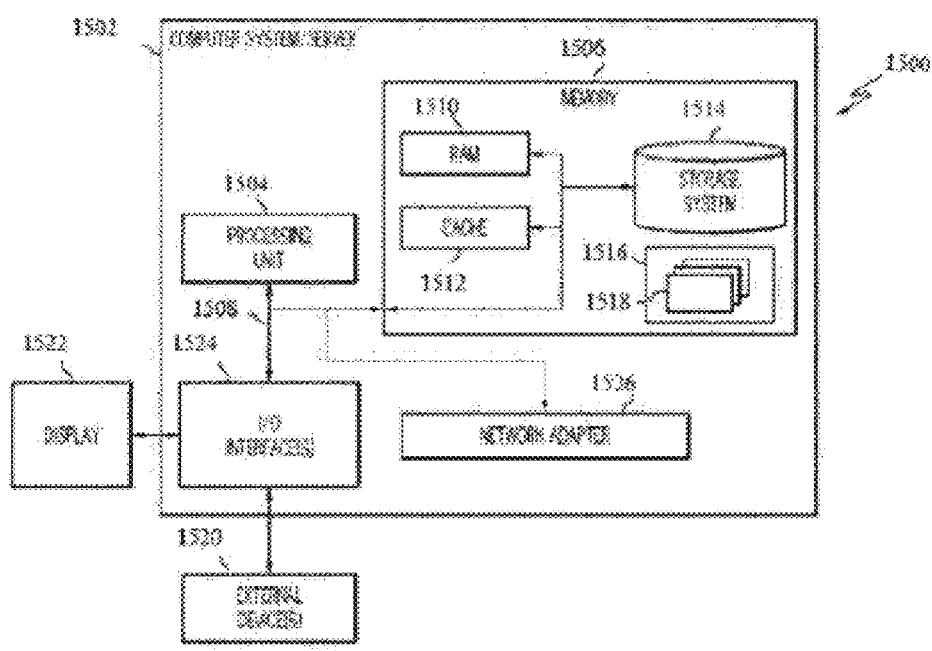
FIG. 4 illustrates an overview of an algorithm of decoding data in accordance with one or more embodiments.
FIG. 5 illustrates one example of a computing or processing node 1500 for operating a method or a software architecture in accordance with the present application.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present application relate to software architectures that deliver dense and accurate 3D range geometry information over existing standard wireless networks. A procedure associated with the software architectures include two steps: (1) encode 3D geometry and color texture into standard 2D images that are packed into a 2D compressed video; and (2) decoding the 2D compressed video to recover the original 3D geometry and color texture.

An Acquisition Module is a structured light scanner that acquires high-resolution 3D video data including 3D geometry and color texture in real time. The scanner consists of a single camera and a single projector, and uses the principle of triangulation for 3D shape reconstruction. Each 3D reconstruction requires a sequence of structured patterns that vary sinusoidally along one direction and remain constant along the other direction. These types of sinusoidal patterns are often called fringe patterns; and this type of structured light technique is called digital fringe projection (DFP). Instead of directly using intensity information for 3D shape reconstruction, the DFP technique extracts the phase of phase-shifted fringe patterns for 3D shape reconstruction. Compared with conventional structured light techniques, the DFP technique has the advantage of simultaneously achieving high resolution (i.e., at camera pixel level) and high speed.

The DFP system according to various embodiments of the present application relate to two sets of patterns with different frequencies, each having three phase-shifted patterns described as:

$$I_k^h(x, y) = I'(x, y) + I''(x, y)\cos\left(\phi^h + \frac{2k\pi}{3}\right), \quad (1)$$

$$I_k^h(x, y) = I'(x, y) + I''(x, y)\cos\left(\phi^l + \frac{2k\pi}{3}\right), \quad (2)$$

Here, k={1, 2, 3}, I'(x, y) is the average intensity, I"(x, y) is the intensity modulation, and $\phi^h(x, y)$ and $\phi^l(x, y)$ is the high frequency phase and low frequency phase, respectively. Simultaneously solving three equations with the same frequency phase leads to:

$$I'(x, y) = I_t^g(x, y) = \frac{I_1^h + I_2^h + I_3^h}{3}, \quad (3)$$

$$I''(x, y) = \sqrt{3(I_2^h - I_1^h)^2 + (2I_3^h - I_2^h - I_1^h)^2} / 3, \quad (4)$$

$$\phi^h(x, y) = \tan^{-1}([\sqrt{3}(I_2^h - I_1^h)] / [(2I_3^h - I_2^h - I_1^h)]) \quad (5)$$

$$\phi^l(x, y) = \tan^{-1}([\sqrt{3}(I_2^l - I_1^l)] / [(2I_3^l - I_2^l - I_1^l)]) \quad (6)$$

Both low and high frequency phase maps obtained here are called wrapped phase maps since they are bounded by (−π,π] due to the use of an inverse tangent function. To recover the original phase value, the 2π discontinuous locations need to be identified and corrected; this is done through a step called phase unwrapping. The system combines these two frequency phase maps and uses a two-frequency phase unwrapping method to obtain an unwrapped phase map Φ(x, y) for the high-frequency fringe patterns. The unwrapped phase is further used to reconstruct (x, y, z) coordinates per pixel once the system parameters (e.g. focal lengths of the camera and the projector, the transformation from the projector coordinate system to the camera coordinate system) are pre-calibrated.

Besides acquiring 3D geometry, DFP techniques naturally come with a texture image $I_t^g$ (x, y), and if a single sensor color camera is used, $I_t^g$(x, y) can be converted to a color image through the demoisacing process. The texture image here is naturally pixel-aligned to the 3D coordinates as it is computed from the same data as the coordinates themselves. This prevents occlusion and ghosting artifacts which are common when the texture and 3D geometry are captures from different perspectives. Since the two-frequency phase unwrapping algorithm allows (x, y, z) coordinates and color texture to be computed independently for each pixel, the entire acquisition pipeline lends itself towards parallelization and implementation on the graphics processing unit (GPU). The Acquisition Module packs each set of six fringe images into the channels of two RGB images, and these two RGB images are then unloaded to the GPU as color textures to produce the unwrapped phase map, reconstruct 3D coordinates, and decode color texture information on custom CUDA kernels.

FIG. 1 illustrates an example of reconstructing a 3D single frame. The top row left to right illustrates three color encoded low frequency fringe patterns, three color encoded high frequency fringe patterns, the wrapped low frequency phase $\phi^l$, and the wrapped high frequency phase $\phi^h$. The bottom row from left to right shows the original texture $I_t^g$ directly extracted from three phase-shifted fringe images, the unwrapped phase Φ, the reconstructed 3D geometry, and the color texture are demosaicing the texture image $I_t^g$. For a camera resolution of 480×640, the acquired geometry and color texture is of a high quality.

After an acquisition module captures 3D geometry and color texture in real time, a compression module encodes the 3D data into 2D images that are packed into a video stream. 3D coordinates (x, y, z) of a given pixel (i, j) are recovered directly from the unwrapped Φ(x, y) if the system parameters of the scanner are pre-calibrated. In other words, there exists a one-to-one mapping between the unwrapped phase Φ(x, y) of a point and its recovered (x, y, z) coordinate. Therefore, if 3D coordinates of a pixel are known, one can determine its phase value with known system parameters. Hence, one can use 2D data to represent 3D geometry.

Various embodiments of the present application relate to a method for encoding that recovers geometry without needing to store fringe order information. Such method can use two data channels to encode data, while having one channel free to store additional data. For each pixel (i, j) within the unwrapped phase map, a scaled corresponding phase value phase Φ'(x, y) is encoded as:

$$E_r(i,j) = 0.5 + 0.5 \sin \Phi'(i,j), \quad (7)$$

$$E_g(i,j) = 0.5 + 0.5 \cos \Phi'(i,j), \quad (8)$$

The third color channel, in this case the blue channel, is used to store the natural texture value, $E_b = I_t^g$.

Once the unwrapped phase and texture data are encoded and stored into the output 2D image, E, is downloaded from GPU memory to main memory. Based on the user's desired reconstruction quality, the image E is then further compressed using conventional methods, such as PNG or JPEG. One advantage of the above encoding procedure is that it retains the precision of the phase map while remaining very straightforward to implement. FIG. 2 illustrates an example of an image, E, which encodes the same 3D geometry and color texture illustrated in FIG. 1.

Example 1

FIG. 3 illustrates a method of encoding data in accordance with one or more embodiments. Method 300 starts off with step 305 of obtaining the data of at least one of a geometry information or a texture information of a target. The method additionally includes step 310 of converting the geometry information into a plurality of periodical functions. Additionally, the method includes step 315 of converting the texture information into a second 2-D representation. Further, the method includes step 320 of converting each periodical function of the plurality of periodical functions and the second 2-D representation into an image.

In one or more embodiments, the geometry information includes a single perspective. The texture information includes the single perspective. The each periodical function of the plurality of periodical functions of the geometry information is a smooth periodical function. In some embodiments, the smooth periodical function is at least one of a sine function or a cosine function. In some embodiments, the smooth periodical function is at least one of 0.5+0.5×sin a or 0.5+0.5×cos a, wherein a includes the geometry information. In one or more embodiments, the converting the texture information into the second 2-D representation further includes discretizing the second 2-D representation of the texture information into a digital representation. The digital representation includes at least one of an image, a sequence of data, or an array of data. The sequence of data is ordered or unordered.

In one or more embodiments, the texture information includes a single perspective. In at least one embodiment, the each periodical function of the plurality of periodical functions of the geometry information is a smooth periodical function. The converting the each periodical function of the plurality of periodical functions of the geometry information into the image includes converting the smooth periodical function into a first 2-D representation. The converting the smooth periodical function into the 2-D representation includes discretizing the 2-D representation of the smooth periodical function into a digital representation. The digital representation includes at least one of an image, a sequence of data, or an array of data. The sequence of data is ordered or unordered.

In one or more embodiments of example 1, the texture information includes optical properties of the target. The optical properties includes color information of the target. The color information includes a grey scale.

One of ordinary skill in the art would recognize that operations are added or removed from method 300, in one or more embodiments. One of ordinary skill in the art would also recognize that the order of the operations in method 300 is varied in various alternative embodiments.

Example 2

A software architecture encoded on a non-transitory computer readable medium, the software architecture includes a first protocol, wherein the first protocol is configured to obtain the data of at least one of a geometry information or a texture information of a target. The software architecture additionally includes a second protocol, wherein the second protocol is configured to convert the geometry information into a plurality of periodical functions. Additionally, the software architecture includes a third protocol, wherein the third protocol is configured to convert the texture information into a second 2-D representation. Further, the software architecture includes a fourth protocol, wherein the fourth protocol is configured to convert each periodical function of the plurality of periodical functions and the second 2-D representation into an image.

In one or more embodiments, the geometry information includes a single perspective. The texture information includes the single perspective. The each periodical function of the plurality of periodical functions of the geometry information is a smooth periodical function. In some embodiments, the smooth periodical function is at least one of a sine function or a cosine function. In some embodiments, the smooth periodical function is at least one of 0.5+0.5×sin a or 0.5+0.5×cos a, wherein a includes the geometry information. In one or more embodiments, the third protocol further includes a first module, wherein the first module is configured to discretize the second 2-D representation of the texture information into a digital representation. The digital representation includes at least one of an image, a sequence of data, or an array of data. The sequence of data is ordered or unordered.

In one or more embodiments, the texture information includes a single perspective. In at least one embodiment, the each periodical function of the plurality of periodical functions of the geometry information is a smooth periodical function. In one or more embodiments, the fourth protocol further includes a second module, wherein the second module is configured to convert the smooth periodical function into a first 2-D representation. The second module further includes a third module, wherein the third module is configured to discretize the 2-D representation of the smooth periodical function into a digital representation. The digital representation includes at least one of an image, a sequence of data, or an array of data. The sequence of data is ordered or unordered.

In one or more embodiments of example 1, the texture information includes optical properties of the target. The optical properties includes color information of the target. The color information includes a grey scale.

After encoding, the compressed 2D video is transmitted over existing standard wireless networks through the transmission module. The decoding module receives the compressed 2D video and decompresses it to recover the original 3D geometry and color texture. The visualization module on mobile devices (e.g. smartphones, tablets, laptops, etc) visualizes 3D video in real time.

When the decoding module first connects to the transmission module, the decoding module receives properties about the incoming video stream, including the DFP system's calibration parameters and the video frame dimensions. Using these dimensions, a 2D mesh plane of 3D coordinates is initialized. For example, if the frame dimensions are 480×640, a regular mesh plane of 307,200 vertices will be constructed. This initialization ensures that any pixel within the incoming encoded image, E, corresponds to a single 3D vertex within the mesh. The mesh is also created such that it is modifiable via vertex and fragment GPU shaders. All other properties within the initialization message, M, are sent to the shaders as uniforms.

Once initialized, the decoding module receives any new encoded video frame, decodes it to recover E, and uploads this to the GPU as a color texture to be used within the pre-initialized mesh's shaders. Due to the initialization of the mesh, there is a one-to-one mapping between a vertex, (u, v), of the mesh and a pixel, (i, j), within the encoded image, E. This is used in the vertex shader to modify the mesh's geometry to match 3D geometry which is encoded within E. That is to say, each pixel E(i, j) can now be decoded to reconstruct the original 3D geometry and color texture.

For each vertex (u, v) of the mesh, a wrapped phase value, $\phi_r$, is computed for the data stored within the two chosen color channels of E (e.g. red and green) in various embodiments:

$$\phi_r(u,v)=\tan^{-1}([(E_r-0.5)]/[(E_r-0.5)]) \quad (9)$$

The wrapped phase is then unwrapped using a minimum phase unwrapping technology. According to various embodiments, this is done on the fly in the vertex shader using the DFP system's calibration parameters, the phase scaling factor, and the minimum z value of the capture volume—all of which were made available to the connected client upon initialization. Once the unwrapped phase $\Phi(u, v)$ has been computed, it is converted into a 3D coordinate (x, y, z) using the calibration parameters. Finally, the vertex (u, v) associated with the vertex shader updates its position attribute to the newly derived 3D coordinate.

The color texture image can also be decoded from the received encoded image, E, and this is done within the mesh's fragment shader. To recover a color texture value, a demosaicing operation is performed for each (u, v), using the grayscale texture encoded in $E_b$. To segment the decoded geometry from the black background, the pixel values of E can simply be used. Comparing with original data illustrated in FIG. 1, FIG. 2 illustrates that storing the encoded RGB image in a lossless PNG format does not result in a noticeable loss of data quality, even though the file size was substantially reduced. Various levels of JPEG is also used to further reduce these encoded data sizes. The visualization module thereafter visualizes the 3D video in real time.

Example 3

FIG. 4 illustrates a method of decoding data in accordance with one or more embodiments. Method 400 starts off with step 405 of obtaining a plurality of encoding parameters from an encoding phase, wherein each encoding parameter of the plurality of encoding parameters comprises at least one of an image, a sequence of data, or an array of data. The method additionally includes step 410 of converting at least one of the sequence of data, the image, or the array of data into a 2-D representation. Furthermore, the method includes step 415 of converting the 2-D representation into a 3-D representation using a transformation. In some embodiments, the each encoding parameter of the plurality of encoding parameters includes of at least one of an image, a sequence of data, or an array of data.

In one or more embodiments, the 2-D representation includes at least one of a smooth function or a non-smooth function. The non-smooth function includes $\tan^{-1} x$, wherein x includes the discretized digital representation of the 2-D representation of the smooth periodical function of the geometry information of the target.

In one or more embodiments, the converting to the 2-D representation into the 3-D representation using the transformation includes deriving the transformation using the plurality of encoding parameters. The transformation is at least one of a linear transformation or a non-linear transformation.

In some embodiments of example 3, the transformation is at least one of a linear transformation or a non-linear transformation.

In one or more embodiments, the transformation comprises at least one of a projector's calibration parameters or a camera's calibration parameters. In some embodiments, the projector's calibration parameters are at least one of computationally predetermined or physically ascertained. In some embodiments, the camera's calibration parameters are at least one of computationally predetermined or physically ascertained.

One of ordinary skill in the art would recognize that operations are added or removed from method 400, in one or more embodiments. One of ordinary skill in the art would also recognize that the order of the operations in method 400 is varied in various alternative embodiments.

Example 4

A software architecture encoded on a non-transitory computer readable medium, the software architecture includes a fifth protocol, wherein the fifth protocol is configured to obtain a plurality of encoding parameters from an encoding phase. Each encoding parameter of the plurality of encoding parameters comprises at least one of an image, a sequence of data, or an array of data. The software architecture additionally includes a sixth protocol, wherein the sixth protocol is configured to convert at least one of the sequence of data, the image, or the array of data into a 2-D representation. Furthermore, the software architecture includes a seventh protocol, wherein the seventh protocol is configured to convert the 2-D representation into a 3-D representation using a transformation. In some embodiments, the each encoding parameter of the plurality of encoding parameters includes of at least one of an image, a sequence of data, or an array of data.

In one or more embodiments, the 2-D representation includes at least one of a smooth function or a non-smooth function. The non-smooth function includes $\tan^{-1} x$, wherein x includes the discretized digital representation of the 2-D representation of the smooth periodical function of the geometry information of the target.

In one or more embodiments, the seventh protocol includes a seventh module, wherein the seventh module is configured to derive the transformation using the plurality of encoding parameters. The transformation is at least one of a linear transformation or a non-linear transformation.

In some embodiments of example 3, the transformation is at least one of a linear transformation or a non-linear transformation.

In one or more embodiments, the transformation comprises at least one of a projector's calibration parameters or a camera's calibration parameters. In some embodiments, the projector's calibration parameters are at least one of computationally predetermined or physically ascertained. In some embodiments, the camera's calibration parameters are at least one of computationally predetermined or physically ascertained.

FIG. 5 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer-readable program, which, when executed by a processor, will cause a computer to execute a method of decoding data, wherein the method comprises:
   obtaining a plurality of encoding parameters from an encoding phase, wherein each encoding parameter of the plurality of encoding parameters comprises at least one of an image, a sequence of data, or an array of data;
   converting at least one of the sequence of data, the image, or the array of data into a 2-D representation; and
   converting the 2-D representation into a 3-D representation using a transformation,
   wherein the transformation comprises at least one of a projector's calibration parameters or a camera's calibration parameters, wherein the projector's calibration parameters are physically ascertained and wherein the camera's calibration parameters are physically ascertained.

2. The method of claim 1, wherein the 2-D representation comprises at least one of a smooth function or a non-smooth function.

3. The method of claim 2, wherein the non-smooth function comprises $\tan^{-1} x$, wherein x comprises the discretized digital representation of the 2-D representation of the smooth periodical function of the geometry information of the target.

4. The method of claim 1, wherein the converting of the 2-D representation into the 3-D representation using the transformation comprises:
   deriving the transformation using the plurality of encoding parameters.

5. The method of claim 1, wherein the transformation is at least one of a linear transformation or a non-linear transformation.

6. The method of claim 1, wherein the plurality of encoding parameters comprises at least one of a discretized digital representation of a 2-D representation of a smooth periodical function of a geometry information of a target or a discretized digital representation of a 2-D representation of a texture information of the target.

7. A non-transitory computer-readable medium encoded with a computer-readable program, which, when executed by a processor, will cause a computer to execute a method of processing data, wherein the method comprises:
   obtaining, by an encoding medium, the data of at least one of a geometry information or a texture information of a target;
   converting, by an encoding medium, the geometry information into a plurality of periodical functions;
   converting, by an encoding medium, the texture information into a second 2-D representation;
   converting, by an encoding medium, each periodical function of the plurality of periodical functions and the second 2-D representation into an image;
   obtaining, by an decoding medium, a plurality of encoding parameters, wherein each encoding parameter of the plurality of encoding parameters comprises at least one of an image, a sequence of data, or an array of data;
   converting, by a decoding medium, at least one of the sequence of data, the image, or the array of data into a 2-D representation; and
   converting, by a decoding medium, the 2-D representation into a 3-D representation using a transformation.

8. The method of claim 7, wherein the plurality of encoding parameters comprises at least one of a discretized digital representation of a first 2-D representation of a smooth periodical function of a geometry information of the target or a discretized digital representation of the second 2-D representation of a texture information of the target.

* * * * *